3,153,392
EJECTING DEVICES
Salvadore J. Verona, West Allis, Wis. (3369 S. Howell Ave., Milwaukee 7, Wis.), assignor of one-half interest to Theresa C. Verona
Filed Feb. 28, 1963, Ser. No. 261,596
1 Claim. (Cl. 107—14)

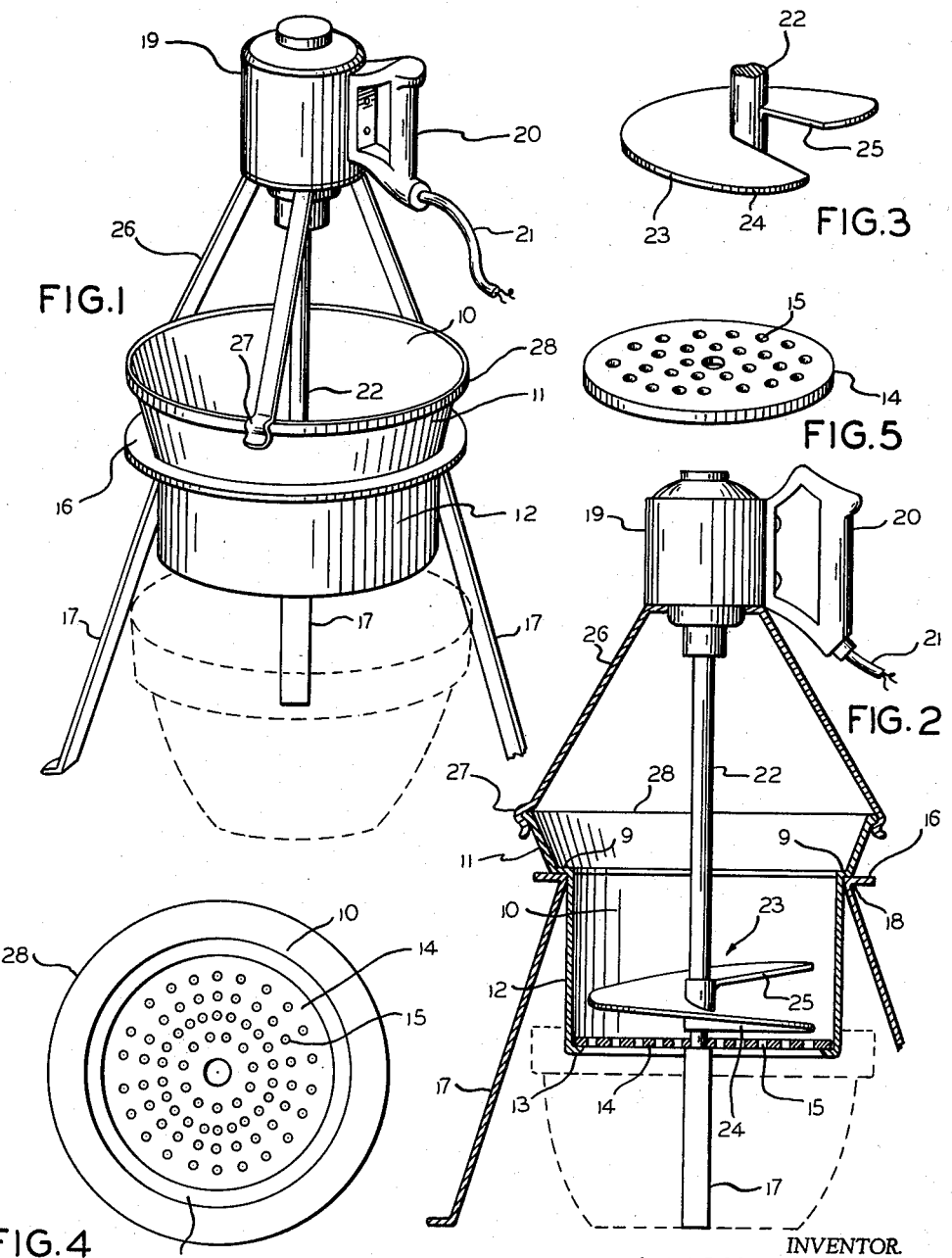

My invention relates to improvements in food ejecting devices and more particularly to a masher and ejector employed for forcing a mass of food or batter through a multi-apertured plate for the formation of noodles, riced potatoes or other strands of food.

The primary object of my invention is to provide a simple, demountable food ejecting device that employs a hopper having an apertured bottom and a shaft mounted spiral blade positioned in the hopper so as to force the food through the apertures upon rotation of the spiral blade, while being so formed that it may be positioned easily over a pot or pan, for convenience in use.

Another object of my invention is to provide a simple support means for the spiral blade and its driving means that can be securely mounted on the hopper, yet can be easily disassembled.

Still another object of my invention is to provide support means for the hopper that permits the positioning of a receiving container under the hopper.

Yet another object of my invention is to provide a food ejecting device having a spiral blade with a straight leading edge to cut through the food and a wiping edge to sweep past an apertured plate and force the mashed food through the apertures in the bottom of a hopper.

Other objects and advantages of my invention will become apparent from the following description taken in conjunction with the drawings and the claim, in which:

FIGURE 1 is a perspective view of the entire assembled device and showing a receptacle in phantom to receive the material being ejected;

FIGURE 2 is a vertical partial cross sectional view of the entire assembled device as shown in FIGURE 1;

FIGURE 3 is a perspective view of the spiral ejector blade attached to the end of the drive shaft;

FIGURE 4 is a top view of the hopper for the batter or product being processed; and FIGURE 5 is a perspective view of the apertured plate which is disposed within the bottom of the hopper.

Similar characters of reference indicate corresponding parts throughout the several views, and referring specifically now to the same, the character 10 shows a hopper with an open top into which food or batter, such as noodle dough or the like is deposited. The hopper has an outwardly inclined wall 11 around its upper portion and a straight wall 12 near its bottom. Intermediate these portions of the hopper is an exterior annular flange 9 extending generally normal to the wall portion 12. In FIGURE 2, I show the wall section 12 bent inward at 13 to removably support a plate 14, which plate has a plurality of equally spaced apertures 15. The number of apertures 15, or their size, or shape, is optional, depending on the type of material being processed. The container or hopper 10 may be any size. The bottom of the hopper may be integral therewith rather than separate.

The hopper framework consists of a circular ring 16 provided with a plurality of depending legs 17 attached to said ring at 18 and employed to support the hopper 10 above the surface of a table or the like, on which the device is disposed. The ring engages the annular flange 9 and receives and supports the hopper 10 so that a receiving container for the ejected food can be positioned under the hopper.

The actuating unit consists of a motor 19, which is shown equipped with a handle 20 for the convenience of its mobility while in use.

The motor 19 can be of any conventional design and may incorporate a speed reducer (not shown), if desired. The cord 21 is shown leading to the motor 19 through the handle 20 in FIGURES 1 and 2. However, it may be attached in any other practical and convenient manner.

A vertical drive shaft 22 extends downwardly from the motor 19. The lower end of shaft 22 is received in the plate 14 in a bearing relation. Shaft 22 is equipped with a spiral blade 23 of circular design to fit the inside of the hopper 10. The blade is spiral and has a flat horizontal portion 24 (normal to the shaft) for wiping the surface of the apertured plate 14 and a straight cutting edge 25 at the upper end thereof which engages the batter or food being processed. Due to the revolving action, the spiral blade will cut the batter or food with the edge 25 and force it spirally downwardly where the wiping portion of the blade will force the batter through the apertures 15 in the plate 14.

The motor 19 is shown supported by a plurality of legs 26 attached thereto to form a tripod framework. The legs are equipped at their lower ends with crimped portions 27 in removable engagement with the rim 28 on the top of the hopper 10. The crimped portions of the legs permit easy engagement of the motor framework with the hopper 10, yet act as a rigid support for the motor 19, and with it the drive shaft 22, to retain the spiral blade 23 in its proper position adjacent the surface of the apertured plate 14 on the bottom of the hopper 10.

If desired, the shaft 22 may be revolved by a crank (not shown) at its upper end, instead of the electrically actuated motor.

The invention provides a novel apparatus for mashing and ejecting food. Because of its novel construction, the device can easily be disassembled for cleaning, storage, or moving, yet when assembled is strong and rigid. The device is highly efficient in operation and is simple to manufacture.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claim.

I claim:

A food extruding device including, in combination, an upstanding generally cylindrical hopper for receiving and holding food to be mashed and ejected, said hopper having a rimmed open top portion and a closed bottom portion containing a plurality of apertures, said hopper being removably mounted on a framework, said framework being formed and adapted to span a receiving container for the ejected food, a shaft mounted spiral blade positioned in said hopper so as to force the contents of the hopper through said apertures into said receiving container upon rotation of said spiral blade, and driving means attached to said shaft to rotate said spiral blade, said driving means being supported above the hopper on a framework having spaced legs forming a tripod, each of said legs having a crimped portion near its lower end, said crimped portions of the legs being releasably engageable with said rimmed portion of said hopper in a resilient snap-fitting engagement to thereby support said driving means framework above the hopper.

References Cited in the file of this patent

UNITED STATES PATENTS

| | | |
|---|---|---|
| 148,321 | Palmer | Mar. 10, 1847 |

FOREIGN PATENTS

| | | |
|---|---|---|
| 138,360 | Germany | July 25, 1934 |
| 700,029 | Great Britain | Nov. 25, 1953 |
| 946,411 | France | Dec. 20, 1948 |